United States Patent [19]

Takahashi

[11] Patent Number: 5,493,479
[45] Date of Patent: Feb. 20, 1996

[54] ELECTRONIC EQUIPMENT

[75] Inventor: Tsutomu Takahashi, Kanagawa, Japan

[73] Assignee: Sony Corporation, Tokyo, Japan

[21] Appl. No.: 350,044

[22] Filed: Nov. 29, 1994

[30] Foreign Application Priority Data

Dec. 6, 1993 [JP] Japan .................................. 5-305634

[51] Int. Cl.⁶ ..................................................... H04B 1/03
[52] U.S. Cl. .......................... 361/814; 361/796; 361/801; 439/806
[58] Field of Search ..................................... 361/814, 752, 361/796, 759, 801, 798; 174/17 R; 292/113, 110, 109, 196, 296; 439/327–329, 806

[56] References Cited

U.S. PATENT DOCUMENTS

| | | | |
|---|---|---|---|
| 4,189,201 | 2/1980 | Romania | 339/75 MP |
| 5,127,683 | 7/1992 | Sato et al. | 292/113 |
| 5,219,191 | 6/1993 | Wolter | 292/157 |

FOREIGN PATENT DOCUMENTS

| | | |
|---|---|---|
| 0507990 | 10/1992 | European Pat. Off. . |
| 4118296 | 12/1991 | Germany . |
| 5149309 | 6/1993 | Japan . |

*Primary Examiner*—Leo P. Picard
*Assistant Examiner*—Y. Whang
*Attorney, Agent, or Firm*—Ronald P. Kananen

[57] ABSTRACT

An electronic equipment, such as a car audio equipment, includes a console unit attached to an equipment body. The attaching mechanism includes an arm, a holder and first and second springs. The arm is attached so as to be rotated in the direction corresponding to the direction in which the console unit is attached to and detached from the equipment body. The holder is rotatably attached to a tip end portion of the arm in an opposing relation to the arm. The holder includes a first engagement portion and a second engagement portion. The first spring applies to the console unit a biasing force in the direction in which the console unit is pushed forward. A second spring is weaker in spring force than the first spring and applies to the holder a biasing force in the direction in which the console unit is pushed forward. The attaching mechanism is arranged such that since the first and second springs are different in spring force from each other, the second engagement portion of the holder is engaged with the engagement portion of the equipment body to hold the console unit under the condition that the console unit is attached to the equipment body and that when the release operation member of the arm is pushed, the second engagement portion of the holder is disengaged from the engagement portion of the equipment body to thereby detach the console unit from the equipment body.

7 Claims, 10 Drawing Sheets

ELECTRONIC EQUIPMENT

BACKGROUND

1. Field of the Invention

The present invention relates to electronic equipment and more particularly to item of electronic equipment whose console unit can be detached from its equipment body.

2. Background of the Invention

Recently, various items of car audio equipment designed to be mounted on automobiles, such as cassette players, CD (compact disc) players, and tuners, are commercially available on the market. A recent problem that such car audio equipment encounters is that the car audio equipment is stolen while the driver is away from the automobile.

To solve the above-mentioned problem, car audio equipment is composed of an equipment body and a console unit (operation unit) such that the console unit having a plurality of operation buttons for operating the electronic equipments can be detachably attached to the equipment body.

When the driver leaves the car, the driver detaches the operation unit and carries the same away from the car. Thus, the equipment body cannot work without the console unit. Therefore, it is possible to prevent the equipment body from being stolen.

Such car audio equipment having the detachable console unit includes an apparatus for attaching and detaching the console unit to and from the equipment body, such as an apparatus proposed by the same assignee of this application (see Japanese Laid-Open Patent Publication No. 5-149308 (JP-A-05 149309)).

However, in the attaching and detaching apparatus of the car audio equipment disclosed in Japanese Laid-Open Patent Publication No. 5-149308, a release mechanism portion for detaching the console unit from the equipment body and a pop-up mechanism portion for projecting the console unit when the console unit is detached are constructed separately. As a result, since the release mechanism portion and the pop-up mechanism portion are independently arranged, the attaching and detaching apparatus becomes complicated in arrangement and increases in the number of assembly parts, which makes the apparatus expensive. As the number of assembly parts is increased, the apparatus becomes large in size on the whole. There is then the problem that the apparatus cannot be miniaturized.

Moreover, in the attaching and detaching apparatus, under the condition that the console unit is attached to the equipment body, the console unit is constantly applied with a load by the spring member so that, when a temperature in the car room rises, the console unit can be deformed thermally.

SUMMARY OF THE INVENTION

In view of such aspects, an object of the present invention is to provide an electronic equipment in which the above-mentioned problems can be solved.

The electronic equipment according to the present invention includes an equipment body, a console unit and a attaching mechanism. The console unit is provided in the equipment body and has a plurality of operation buttons provided on its surface and an engaged portion disposed on its rear surface side. The console unit is electrically connected to the equipment body. The attaching mechanism is provided in the equipment body and detachably attaches the console unit to the equipment body. The attaching mechanism is rotatably provided in the equipment body and has a first rotary arm biased in the direction in which the console unit is opened and a second rotary arm rotatably attached to a free end side of the first rotary arm and biased in the direction in which the console unit is opened. The first rotary arm includes a release operation member operated when the console unit is detached from the equipment body. The second rotary arm includes a first engagement portion which is engaged with the engaged portion of the console unit and a second engagement portion which, when the console unit is attached to the equipment body, is engaged with the equipment body to hold the console unit at a position where the console unit should be attached to the equipment body. The first rotary arm of the attaching mechanism is rotated by operating the release operation member of the first rotary arm when the console unit is detached. The first rotary arm is rotated to thereby rotate the second rotary arm of the attaching mechanism in the direction in which the second engagement portion of the second rotary arm is disengaged from the equipment body. The second rotary arm moves the console unit such that the console unit is detached from the equipment body.

According to the present invention, since the attaching mechanism can be made with fewer assembly parts, the attaching mechanism can be miniaturized.

According to the present invention, when the console unit is attached to the equipment body, the console unit is not applied with any load so that the console unit can satisfactorily be attached to and detached from the equipment body.

DESCRIPTION OF THE INVENTION

An arrangement of an item of electronic equipment according to the present invention will hereinafter be described in detail with reference to the drawings. In the following embodiment, an item of car audio equipment will be described as electronic equipment by way of example.

Figure 1:
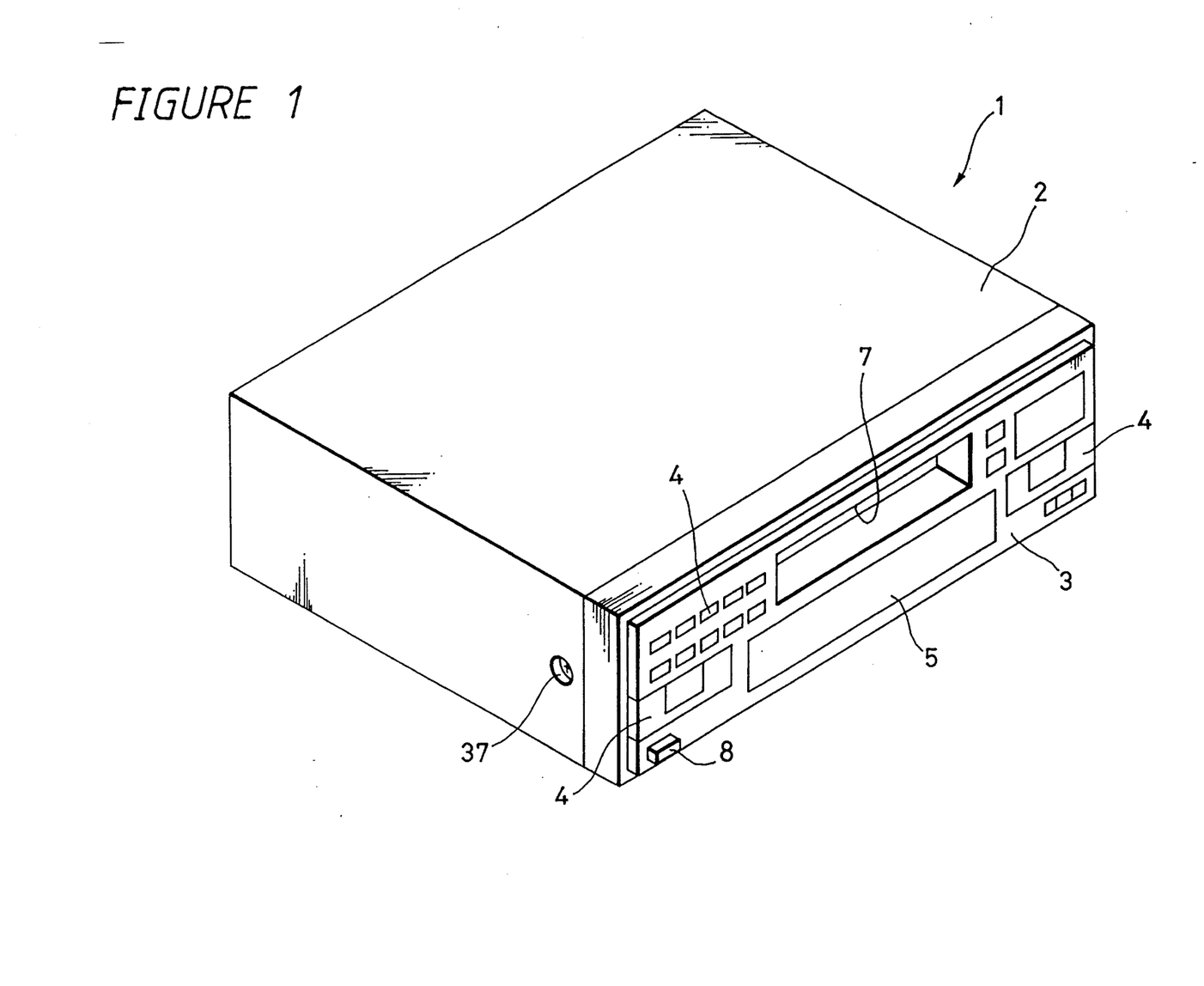
FIG. 1 is a perspective view showing an item of car audio equipment provided as an item of electronic equipment according to the present invention.

In FIG. 1, reference numeral 1 generally depicts an item of car equipment 1 attached to the inside of the automobile, such as a cassette player. The car audio equipment 1 is composed of an equipment body 2 and a front panel 3.

The front panel 3 has a plurality of operation buttons 4 for operating the equipment body 2 and a display unit 5 for displaying an operation state or the like disposed on its front surface. The front panel 3 also has an opening portion corresponding to a cassette insertion mouth 7 of the equipment body 2.

Figure 2:
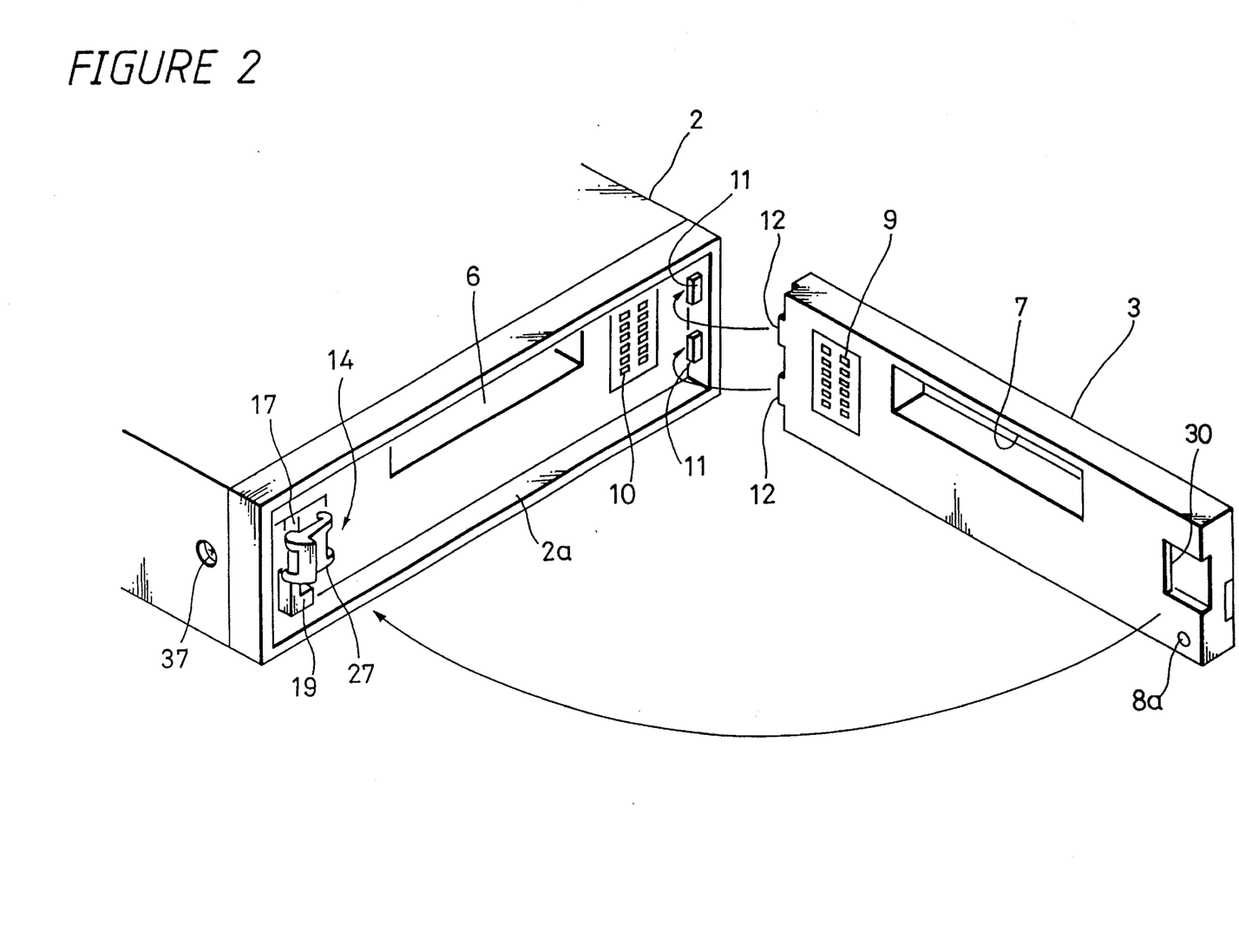
FIG. 2 is a perspective view showing the item of car audio equipment with a front panel being removed.

The front panel 3 has a release button 8 provided on its front surface. When the user pushes the release button 8, the user can detach the front panel 3 from the equipment body 2 as shown in FIG. 2.

The front panel 3 has a plurality of connection terminals 9 provided on its rear surface. The equipment body 2 has a plurality of connection terminals 10 in correspondence with the connection terminals 9 of the front panel 3. When the front panel 3 is attached to the equipment body 2, the connection terminals 9 of the front panel 3 and the connection terminals 10 of the equipment body 2 come in contact with each other to thereby electrically connect the front panel 3 and the equipment body 2.

The equipment body 2 has a frame body 2a provided on its front surface for housing the front panel 3. The frame body 2a has a pair of projection members 11, 11 projected from its inner right-hand surface. The front panel 3 has engagement portions 12, 12 formed on its right side surface in correspondence with the projection members 11, 11.

Under the condition that the engagement portions 12, 12 are in engagement with the projection members 11, 11, the front panel 3 is rotated about the engagement portions 12, 12 and the front panel 3 is attached to the equipment body 2 so as to be housed in the frame body 2a of the equipment body 2. The front panel 3 is fixed and held by an attaching and detaching mechanism 14 provided in the equipment body 2 under the condition that the front panel 3 is accommodated in the frame body 2a of the equipment body 2.

When the user pushes the release button 8 of the front panel 3, the attaching and detaching mechanism 14 detaches the front panel 3, as will be described later on, whereby the front panel 3 is detached from the equipment body 2.

The attaching and detaching mechanism 14 for attaching and/or detaching the front panel 3 to and/or from the equipment body 3 as described above will be described in detail with reference to FIGS. 3 through 8.

Figure 3:
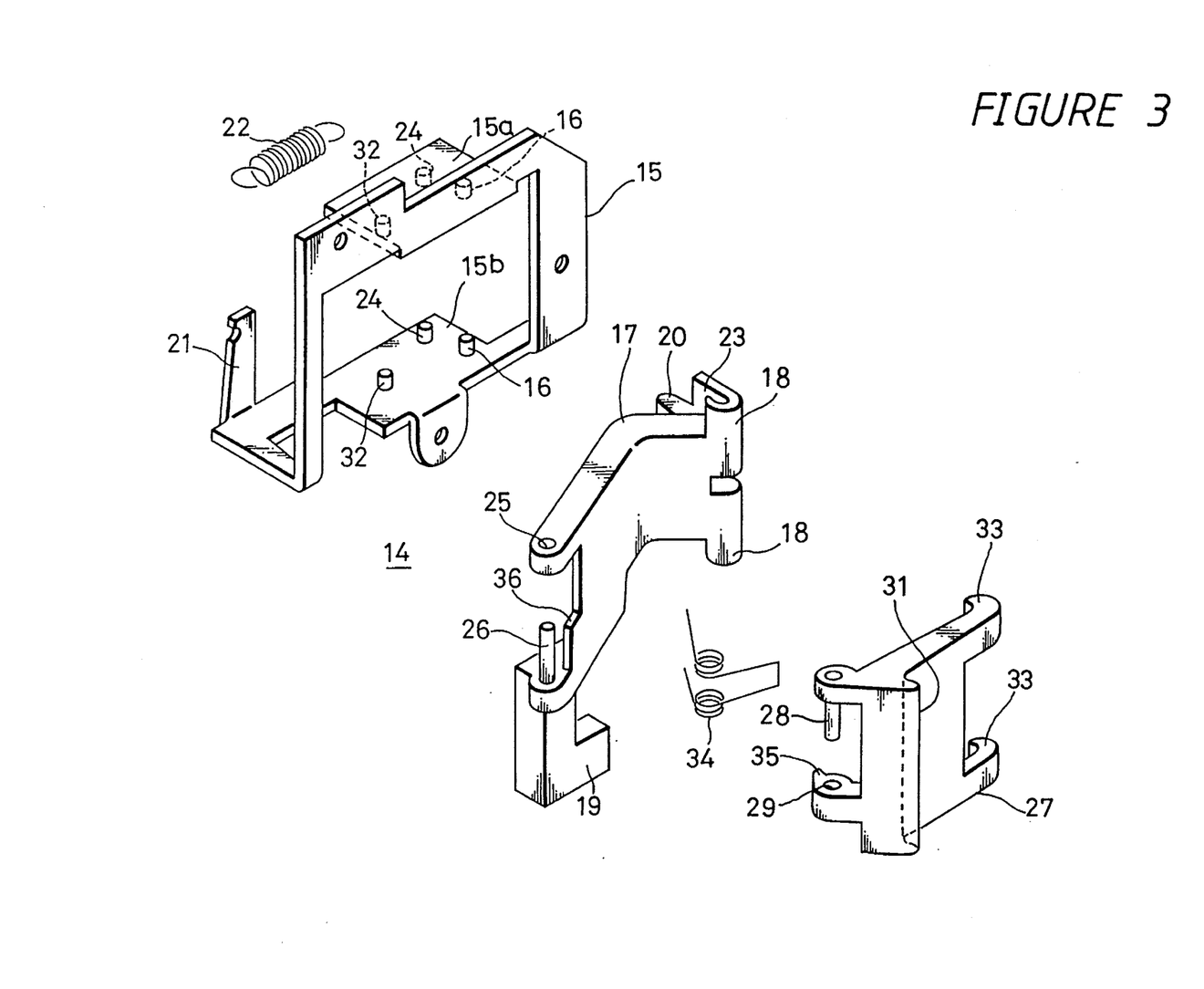
FIG. 3 is an exploded, perspective view showing an attaching and detaching mechanism.

In FIG. 3, reference numeral 15 depicts an attachment and support plate serving as a base plate of the attaching and detaching mechanism 14. The attachment and support plate 15 is fixed to a housing of the equipment body 2 by suitable fixing devices, such as screws or the like.

An arm 17 is attached to the attachment and support plate 15 so as to become rotatable in the direction corresponding to the direction in which the front panel 3 is attached to and detached from the equipment body 2.

FIG. 3 shows an attachment structure to attach the arm 17 to the attachment and support plate 15. As shown in FIG. 3, the attachment and support plate 15 has upper and lower horizontal plate portions 15a, 15b and cylindrical shafts 16, 16 which are projected on the respective upper and lower horizontal plate portions 15a, 15b in an opposing fashion. The arm 17 has partly-recessed bearing portions 18, 18 formed at its base end portion. The bearing portions 18, 18 are engaged with the cylindrical shafts 16, 16 through their recessed portions, whereby the arm 17 is pivottably supported by the attachment and support plate 15.

The arm 17 has a release operation member 19 which is integrally elongated in the lower direction of its tip end portion. As will be described in detail later, when the release operation member 19 is pushed by the release button 8 of the front panel 3, the front panel 3 is detached from the equipment body 2.

The arm 17 is constantly spring-biased so as to rotate in the forward projecting direction by a first spring member 22 tensioned between a spring hook portion 20 formed on a part thereof and a spring hook projection 21 projected on the attachment and support plate 15.

The arm 17 is restricted to further rotate in the forward direction under the condition that it is projected forward by a predetermined angle when a stopper wall 23 continuously formed from the bearing portion 18 are brought in contact with and in engagement with stopper projection 24 projected on the attachment and support plate 15.

The arm 17 has a holder 27 for holding the front panel 3 pivottably opposed to the tip end thereof.

As shown in FIG. 3, in the attachment structure for attaching the holder 27 to the arm 17, the arm 17 has a shaft aperture 25 defined at its tip end portion and a cylindrical shaft 26 formed thereat, both of which are formed coaxially. The holder 27 has a cylindrical shaft 28 formed at its base end and a shaft aperture 29 defined thereat, both of which are coaxially formed so as to correspond to the shaft aperture 25 and the cylindrical shaft 26 of the arm 17. At the same time when the shaft 26 of the arm 17 is fitted into the shaft aperture 29 of the holder 27, the shaft 28 of the holder 27 is fitted into the shaft aperture 25 of the arm 17, the holder 27 is pivottably supported to the arm 17.

The holder 27 includes a first projected engagement portion 31 which is engaged with an engagement concave portion 30 formed on the rear surface of the front panel 3 and a pair of second hook-shaped engagement portions 33, 33 which are engaged with cylindrical engagement projections 32, 32 projected therefrom in an opposing relation to the upper and lower level boards 15a, 15b of the attachment and support plate 15. Under the condition that the first engagement portion 31 is engaged with the engaging concave portion 30 of the front panel 3, the second engagement portions 33, 33 are engaged with the cylindrical engagement projections 32, 32 of the attachment and support plate 15, thereby holding the front panel 3 in the state that the front panel 3 is attached to the equipment body 2.

The holder 27 is biased so as to rotate in the forward direction, i.e., in the direction in which the front panel 3 is pushed under spring force of a second spring member 34 disposed between it and the arm 17.

As shown in FIG. 3, the second spring member 34 is shaped such that a pair of upper and lower symmetrical torsion coil springs are integrally connected at their one ends. Coil portions of the second spring member 34 are fitted into the shaft 28 of the holder 27 and the shaft 26 of the arm 17. One end of the second spring member 34 is engaged with the holder 27 and the other end thereof is engaged with the arm 17. Therefore, the holder 27 is biased so as to rotate in the direction in which the holder 27 is opened with respect to the arm 17, i.e., in the forward direction in which the front panel 3 is pushed under spring force of the second spring member 34 under the condition that the holder 27 is kept parallel to the arm 17 satisfactorily.

The second spring member 34 for rotating and biasing the holder 27 is different in spring force from the first spring member 22 for rotating and biasing the arm 17. In other words, the spring force of the second spring member 34 is set smaller than that of the first spring member 22.

The holder 27 is restricted to further rotate under the condition that the holder 27 is opened at a predetermined angle relative to the arm 17 when a stopper projection 35 formed on a part thereof is engaged with a stopper wall portion 36 formed on the arm 17 side.

Figure 4:
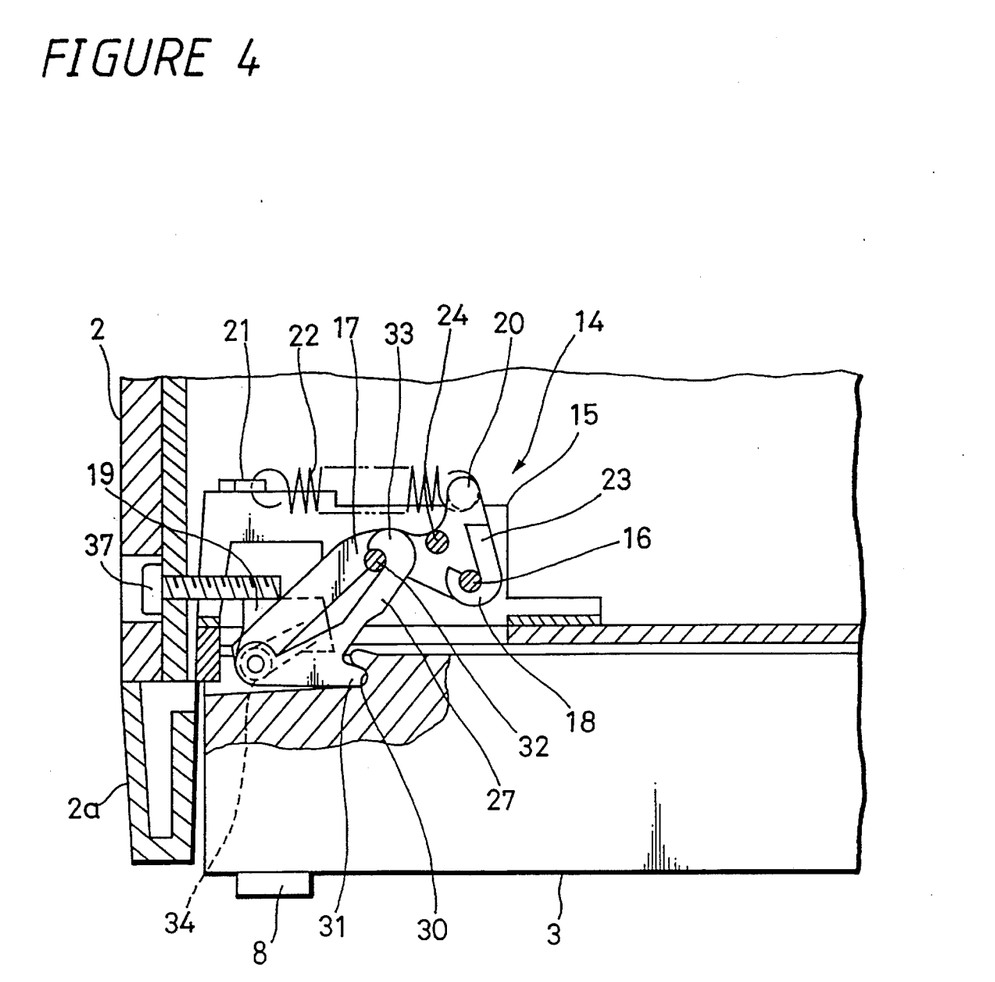
FIG. 4 is a plan view showing the attaching and detaching mechanism with the front panel being attached.

As shown in FIG. 4, in the attaching and detaching mechanism 14 thus arranged, a stopper screw 37 is fitted into a chassis of the equipment body 2 in an opposing relation to the rear portion of the release operation portion 19 of the arm 17. As will be described in detail later, the stopper screw 37 can prevent the arm 17 from being moved backward to thereby inhibit the front panel 3 from being detached from the equipment body 2.

Figure 10A:
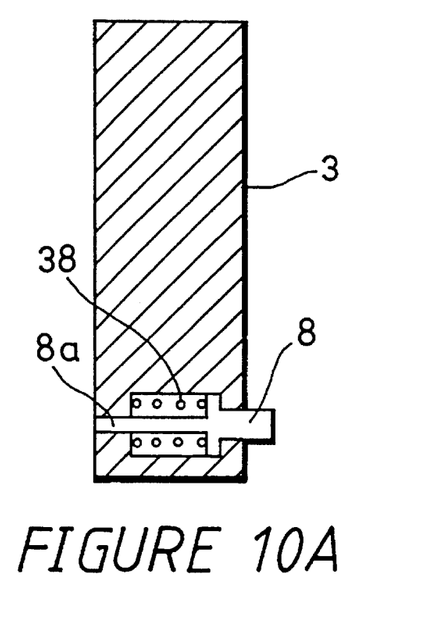
FIGS. 10A and 10B are diagrams used to explain a release button of the front panel.
Figure 10B:
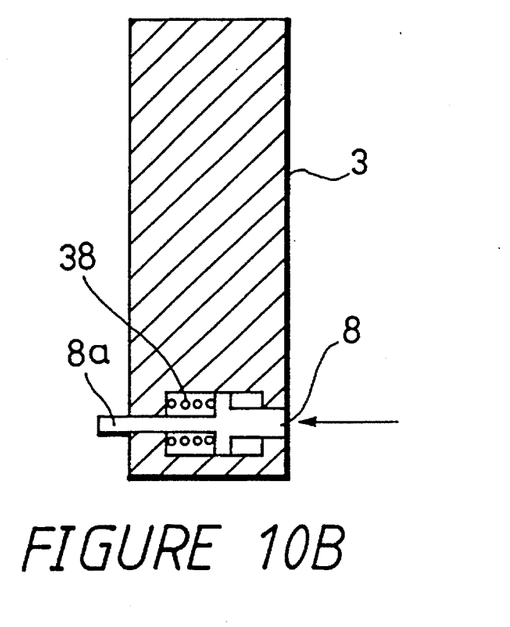

FIGS. 10A and 10B show a structure of the release button 8 provided on the front panel 3 to operate the attaching and detaching mechanism 14.

The release button 8 has a push pin 8a formed integrally therewith. The push pin 8a is communicated to the rear surface of the front panel 3. As shown in FIG. 10A, in the normal state, the push pin 8a is retracted inside the front panel under spring force of a spring member 38 disposed in the front panel 3. As shown in FIG. 10B, when the release button 8 is pushed against the spring force of the spring member 38, the push pin 8a is projected from the rear surface of the front panel 3. The release operation member 19 of the arm 17 of the attaching and detaching mechanism 14 is pressed by the push pin 8a.

Operation of the attaching and detaching mechanism 14 thus arranged will be described below.

FIG. 4 show the state that the front panel 3 is attached to the equipment body 2. In the state shown in FIG. 4, the first engagement portion 31 of the holder 27 is engaged with the engagement concave portion 30 of the front panel 3 and the second engagement portions 33, 33 of the holder 27 are engaged with the cylindrical engagement projections 32, 32 of the attachment and support plate 15.

In the state shown in FIG. 4, because of a difference between the spring force of the first spring member 22 and that of the second spring member 34, i.e., because the first spring member 22 is stronger in spring force than the second spring member 34, the second engagement portions 33, 33 of the holder 27 are engaged with the cylindrical engagement projections 32, 32 of the attachment and support plate 15 under spring force of the first spring member 22. Therefore, the attaching and detaching mechanism 14 is placed in the locked state so that the front panel 3 is kept attached to the equipment body 2.

In this state, a pair of the second engagement portions 33, 33 provided on upper and lower sides of the holder 27 as shown in FIG. 3 are respectively engaged with the cylindrical engagement projections 32, 32 of the upper and lower horizontal plate portions 15a, 15b of the attachment and support plate 15 so that the front panel 3 is held in the stable state.

As shown in FIG. 4, under the condition that the front panel 3 is attached to the equipment body 2, the stopper screw 37 is fitted into the chassis of the equipment body 2, whereby the tip end portion of the stopper screw 37 is opposed to the rear portion of the release operation member 19 of the arm 17. Consequently, even though the release button 8 of the front panel 3 is pressed, the arm 17 cannot be rotated rearwardly. Accordingly, it becomes impossible to break the locked state of the attaching and detaching mechanism 14. Thus, the front panel cannot be detached from the equipment body 2. Therefore, in some cases, such as when the driver leaves the automobile, it is possible to prevent the front panel 3 of the car audio equipment 1 from being stolen.

When the front panel 3 is detached form the equipment body 2 under this state, the stopper screw 37 is unscrewed. Then, when the user pushes the release button 8 of the front panel 3, the push pin 8a integrally formed with the release button 8 is projected from the rear surface of the front panel 3 to press the release operation member 19, whereby the arm 17 can be rotated backward against the spring force of the first spring member 22.

Figure 5:
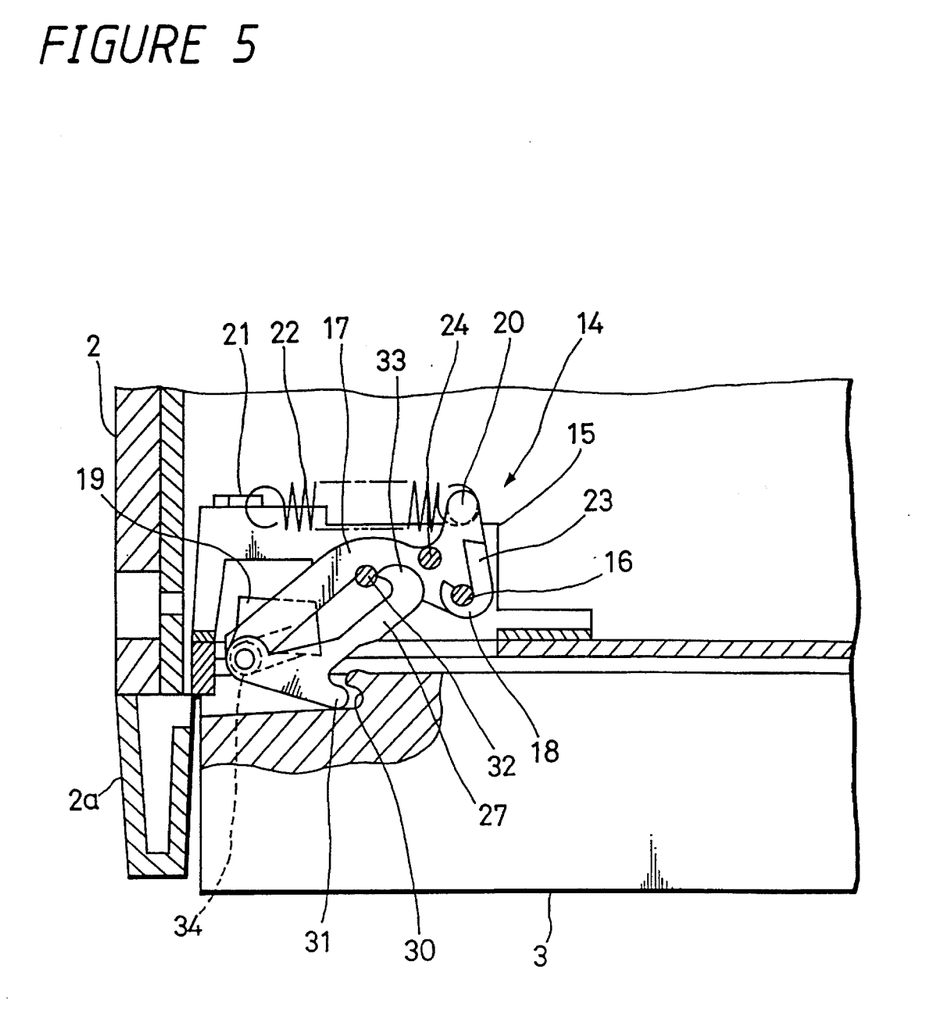
FIG. 5 is a diagram used to explain how to detach the front panel from the attaching and detaching mechanism.

As shown in FIG. 5, when the arm 17 is rotated backward, the holder 27 is rotated under the spring force of the spring member 34 such that the second engagement portions 33, 33 thereof are disengaged from the cylindrical engagement projections 32, 32 of the attachment and support plate 15. Simultaneously, the spring force of the release button spring member 38 of the front panel 3 is applied to the front panel 3 in the direction in which it biases the front panel 3 backward, but the spring force of the second spring member 34 is stronger than that of the spring member 38. Therefore, the holder 27 of the front panel 3 is slightly pushed forward.

When the user releases the release button 8 from being depressed at that very moment, the arm 17 is rotated forward under spring force of the first spring member 22 and the holder 27 is rotated forward under spring force of the second spring member 34. Specifically, as shown in FIG. 6, the front panel 3 is rotated forward by the sum of the spring forces of the first and second spring members 22, 34 and popped up.

Figure 6:
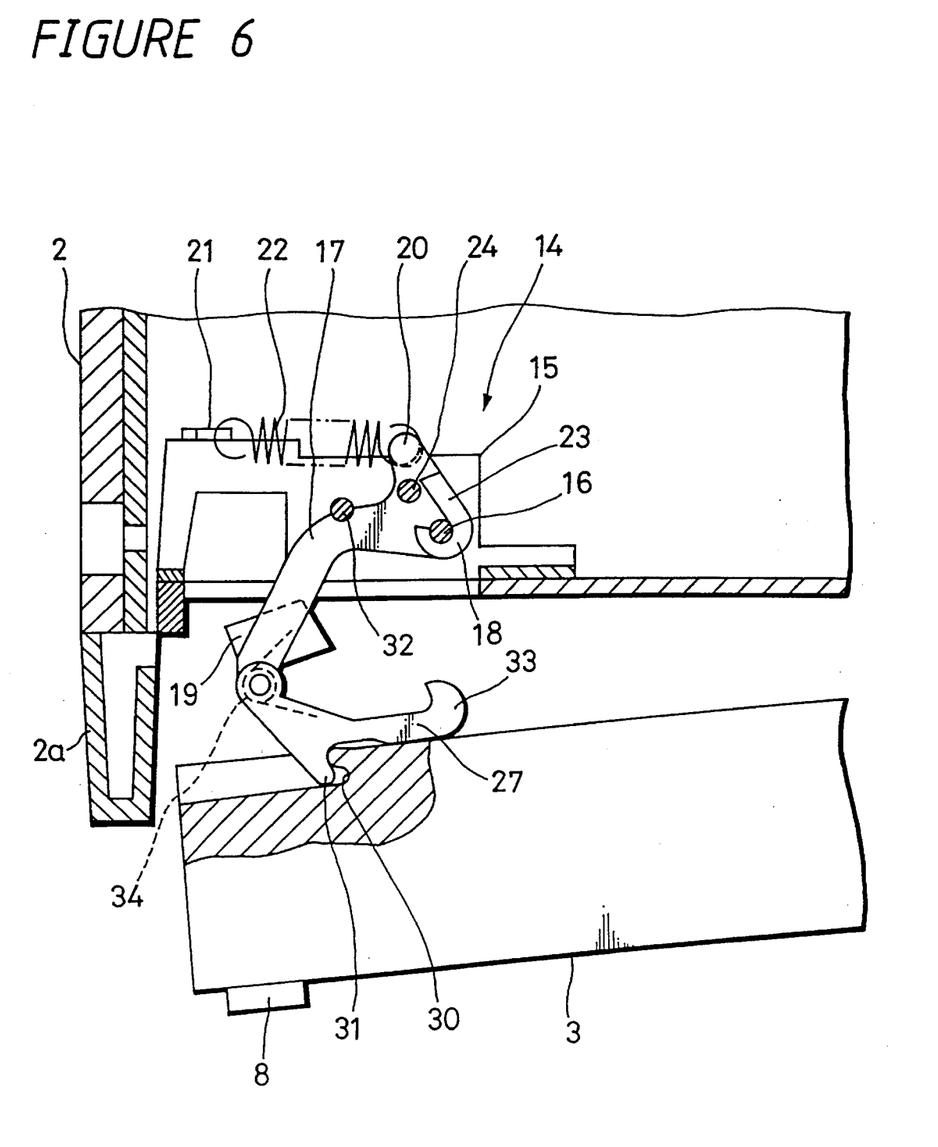
FIG. 6 is a diagram used to explain how to detach the front panel from the attaching and detaching mechanism.

In the state shown in FIG. 6, the holder 27 is stopped at its stopper projection 35 by the stopper surface 36. As a result, the spring force of the second spring member 34 is canceled and the first engagement portion 31 of the holder 27 is engaged with the engagement concave portion 30 of the front panel 3 under spring force of the first spring member 22, thereby the front panel 3 is held.

Under the condition that the front panel 3 is popped up as shown in FIG. 6, when the user strongly draws the front panel 3 forward with his hand to disengage the engagement concave portion 30 thereof from the first engagement portion 31 of the holder 27, whereby the front panel 3 can completely be detached (released) from the equipment body 2.

When the holder 27 is forcibly pulled in the forward direction under the condition that the front panel 3 is detached from the equipment body 2, the arm 17 can be moved with respect to the shaft portion 16 of the attachment and support plate 15 because the bearing portion 18 of the arm 17 is partly opened. Therefore, it is possible to prevent the arm 17 from being broken.

Figure 7:
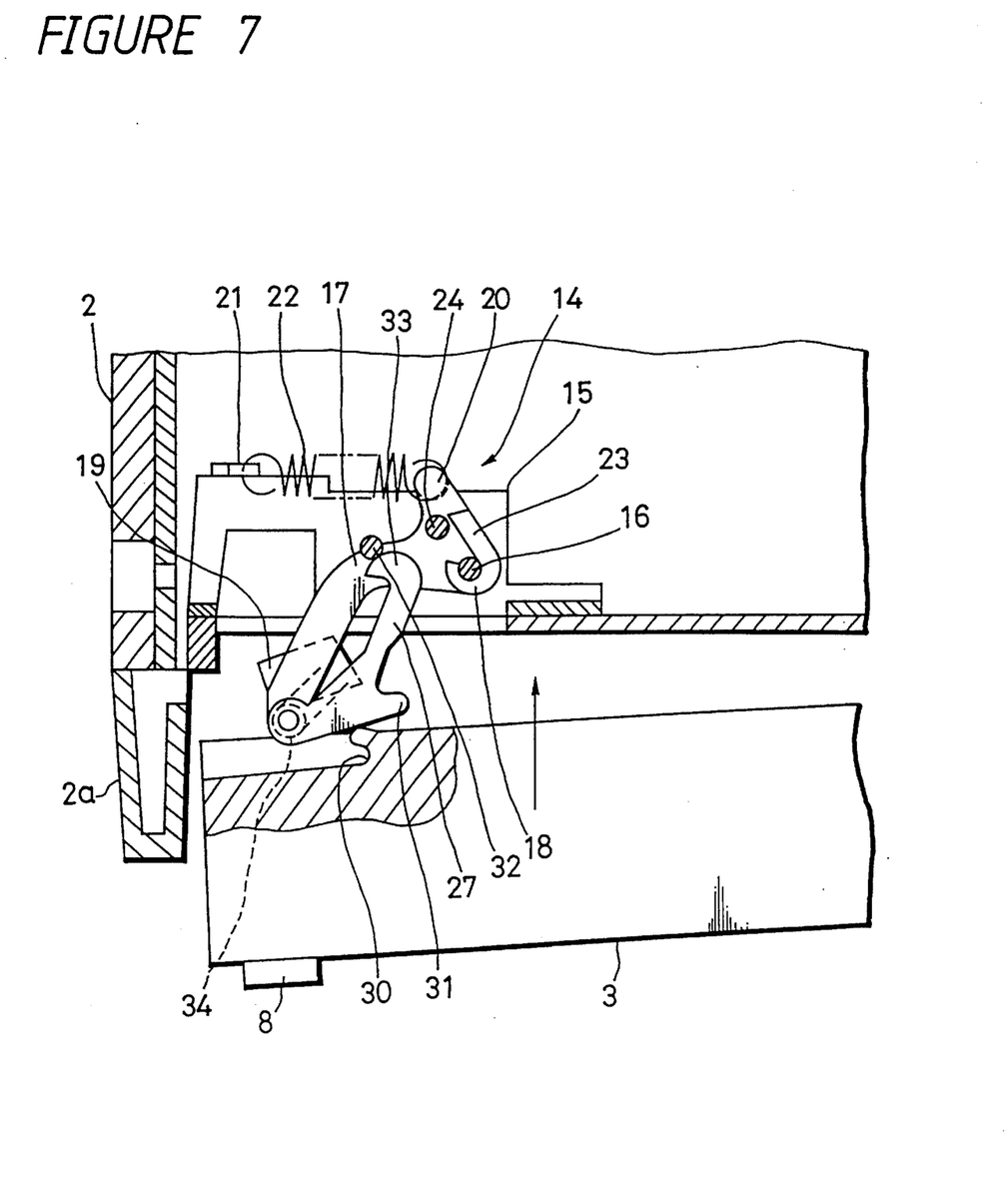
FIG. 7 is a diagram used to explain how to attach the front panel to the attaching and detaching mechanism.

When the front panel 3 is attached to the equipment body 2, if the holder 27 is continuously pressed by the front panel 3 as shown in FIG. 7, the holder 27 is rotated backward and brought in contact with the arm 17 because the second spring member 34 is weaker in spring force than the first spring member 22. Under this condition, if the front panel 3 is further pressed, then the arm 17 is rotated backward against the spring force of the first spring member 22. Then, the hook-shaped second engagement portions 33, 33 of the holder 27 are engaged with the cylindrical engagement projections 32, 32 of the attachment and support plate 15 and the first engagement portion 31 of the holder 27 is engaged with the engagement concave portion 30 of the front panel 3. As a result, as shown in FIG. 4, the front panel 3 is attached to and held by the equipment body 2.

Figure 8:
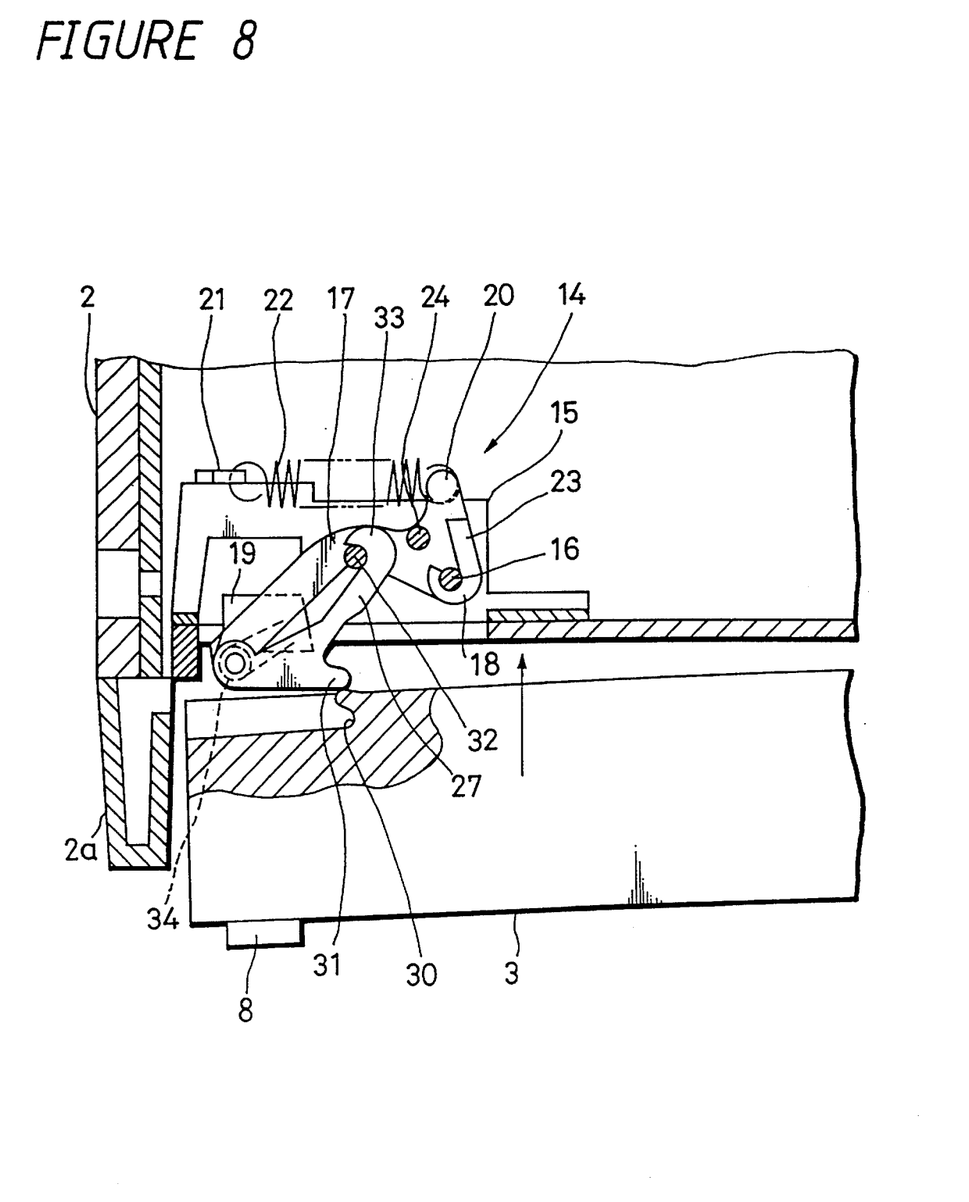
FIG. 8 is a diagram used to explain how to attach the front panel to the attaching and detaching mechanism.

As shown in FIG. 8, under the condition that the second engagement portions 33, 33 of the holder 27 are previously engaged with the cylindrical engagement projections 32, 32 of the attachment and support plate 15, it is possible to attach the front panel 3 to the equipment body 2 by pushing the front panel 3 with a pressure.

If the front panel 3 is detached from the equipment body 2 with an extra force under the condition that the front panel 3 is attached to the equipment body 2 as shown in FIG. 4, then the second engagement portions 33, 33 are slipped and disengaged from the cylindrical engagement portions 32, 32 with the application of extra force because the hook-shape of the second engagement portions 33, 33 of the holder 27 is set so as to form substantially a clearance angle with respect to the direction in which the front panel 3 is detached from the equipment body 2. Therefore, the arm 17, the holder 27 and the front panel 3 can be prevented from being broken. However, the second engagement portions 33, 33 are not released from the cylindrical engagement projections 32, 32 by a force of some magnitude, so that the front panel 3 can never be dropped from the equipment body 2 with the application of an external impact.

Figure 9:
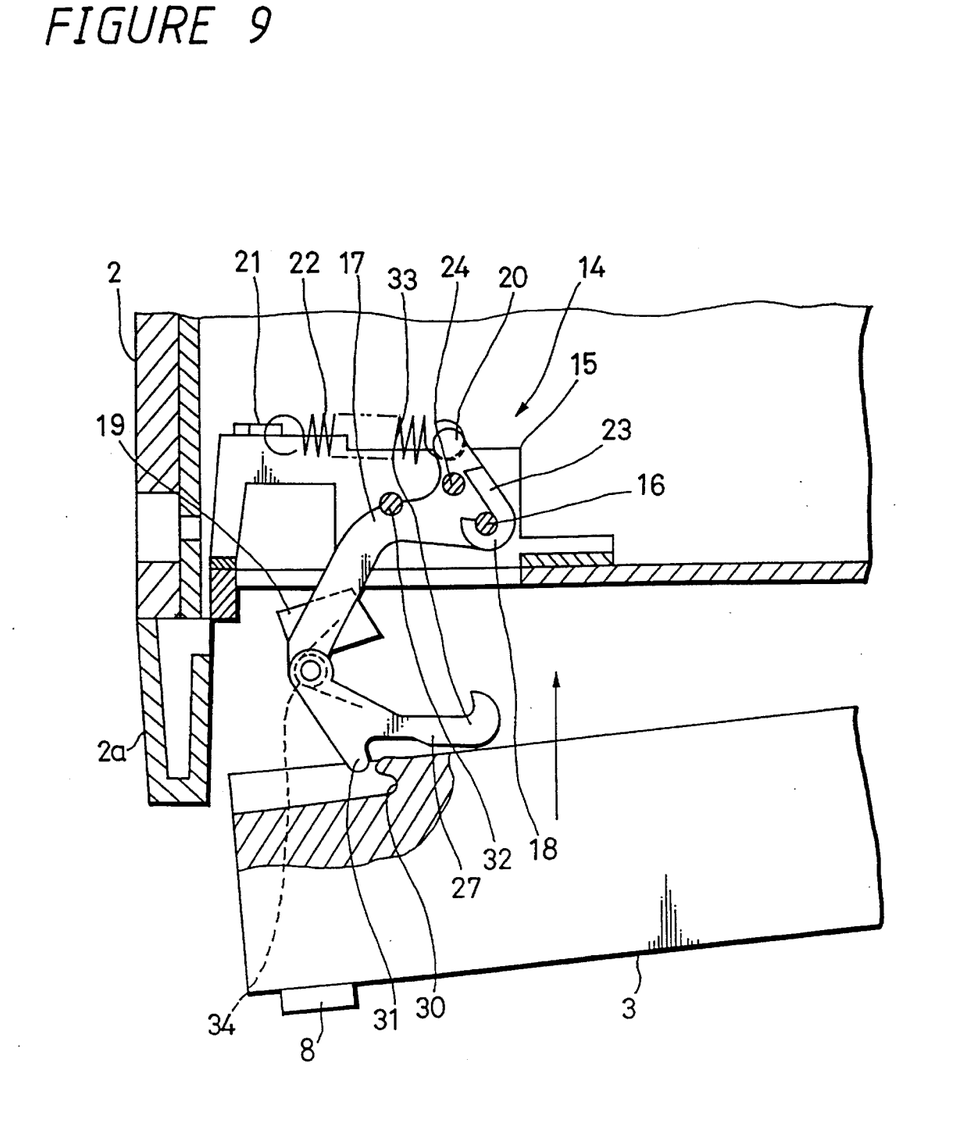
FIG. 9 is a diagram used to explain another example of the attaching and detaching mechanism.

If the holder 27 is rotated forward and engaged at a larger angle with respect to the arm 17 as shown in FIG. 9, then when the front panel 3 is attached to the equipment body 2, the first engagement portion 31 of the holder 27 can be engaged with the engagement concave portion 30 of the front panel 3. As a result, the front panel 3 can smoothly be attached to the equipment body 2.

The attaching and detaching mechanism 14 according to this embodiment thus arranged and operated is arranged such that the arm 17 serves as both the release portion for detaching the front panel 3 and the pop-up portion for pushing the front panel 3 when the front panel 3 is detached from the equipment body 2. Therefore, the assembly parts of the attaching and detaching mechanism 14 can be reduced more.

Specifically, the attaching and detaching mechanism 14 is formed of only five assembly parts, i.e., the attachment and support plate 15, the arm 17, the holder 27 and the first and second spring members 22, 34. Therefore, the attaching and detaching mechanism of the present invention can be made inexpensive considerably as compared with the prior art.

Of the assembly parts of the attaching and detaching mechanism 14, three assembly parts are molded by using metal molds, i.e., it is sufficient to prepare three metal molds. Therefore, there is then the advantage that, when the attaching and detaching mechanism 14 is manufactured overseas, the development of the local production can be made with ease.

The attaching and detaching mechanism 14 is arranged such that the holder 27 is engaged at its second engagement portions 33, 33 with the cylindrical engagement projections 32, 32 to thereby hold the front panel 3. Therefore, the front panel 3 is not substantially applied with a spring force of the spring members with the result that the front panel 3 can be prevented from being thermally deformed even when a temperature rises considerably in the car interior.

The attaching and detaching mechanism 14 is arranged such that the front panel 3 is attached and detached on the basis of a balance of spring forces of the first and second spring members 22, 34. Therefore, the user can get a satisfactory sense of touching when to attach and/or detach the front panel 3 to and/or from the equipment body 2 as compared with those of similar kind. Therefore, it is possible to provide car audio equipment which is easy and convenient to use.

Having described preferred embodiments of the present invention with reference to the accompanying drawings, it is to be understood that the present invention is not limited to those embodiments and that various changes and modifications can be effected therein by one skilled in the art without departing from the spirit of the present invention as defined in the appended claims.

What is claimed is:

1. Electronic equipment comprising;

an equipment body;

an operation portion provided on said equipment body and having a plurality of operation buttons disposed on its front surface and an engaged portion formed on its rear surface, said operation portion being electrically connected to said equipment body; and an attachment mechanism provided in said equipment body for detachably attaching said operation portion to said equipment body, said attachment mechanism comprising a first rotary arm rotatably provided in said equipment body and spring-biased in the direction in which said operation portion is opened and a second rotary arm rotatably provided at a free end side of said first rotary arm and spring-biased in said opening direction, said first rotary arm having an operated portion operated by release operation when said operation portion is detached from said equipment body, said second rotary arm having a first engagement portion engaged with said engaged portion and a second engagement portion engaged with said equipment body to hold said operation portion at its attachment position with respect to said equipment body under the condition that said operation portion is attached to said equipment body, wherein when said operation portion is detached, said first rotary arm is rotated by operating said operated portion of said first rotary arm, said second rotary arm is rotated in the direction in which said second engagement portion is disengaged from said equipment body in accordance with the rotation of said first rotary arm, and said second rotary arm moves said operation portion in the direction in which said operation portion is detached from said equipment body.

2. Electronic equipment according to claim 1, wherein said attachment mechanism further comprises a detachment operation portion provided in said operation portion for pushing said operated portion of said first rotary arm when said operation portion is detached from said equipment body.

3. Electronic equipment according to claim 2, wherein said detachment operation portion is formed on its one end side of said operation portion and said operation portion has an engagement portion formed on the other end thereof so as to be engaged with an engagement projection formed on said equipment body.

4. Electronic equipment according to claim 2, wherein said attachment mechanism includes a blocking member for inhibiting said first rotary arm from being rotated by said detachment operation portion under the condition that said operation portion is attached to said equipment body.

5. Electronic equipment according to claim 1, wherein said attachment mechanism further comprises a first biasing member for biasing said first rotary arm in the direction in which said operation portion is opened and a second biasing member for biasing said second rotary arm in said opening direction and wherein a biasing force of said first biasing member is greater than that of said second biasing member.

6. Electronic equipment according to claim 5, wherein said attachment mechanism further comprises a support member attached to said equipment body, said first rotary arm being rotatably attached at its base end side to said support member, and said first biasing member being attached at its one end to said first rotary arm and attached at its other end to said support member.

7. Electronic equipment according to claim 1, wherein said attachment mechanism includes a blocking member for inhibiting said first rotary arm from being rotated under the condition that said operation portion is attached to said equipment body.

\* \* \* \* \*